United States Patent
Shimao et al.

(10) Patent No.: US 10,225,453 B2
(45) Date of Patent: Mar. 5, 2019

(54) IMAGING APPARATUS AND CONTROL METHOD FOR IMAGING APPARATUS

(71) Applicant: OLYMPUS CORPORATION, Hachioji-shi, Tokyo (JP)

(72) Inventors: Masao Shimao, Tokyo (JP); Norihiko Ozaki, Sagamihara (JP)

(73) Assignee: Olympus Corporation, Tokyo (JP)

( * ) Notice: Subject to any disclaimer, the term of this patent is extended or adjusted under 35 U.S.C. 154(b) by 22 days.

(21) Appl. No.: 15/398,574

(22) Filed: Jan. 4, 2017

(65) Prior Publication Data

US 2017/0201671 A1  Jul. 13, 2017

(30) Foreign Application Priority Data

Jan. 12, 2016 (JP) .................................. 2016-003491

(51) Int. Cl.
- *H04N 5/232* (2006.01)
- *H04N 5/77* (2006.01)
- *H04N 5/907* (2006.01)

(52) U.S. Cl.
CPC ..... *H04N 5/23203* (2013.01); *H04N 5/23216* (2013.01); *H04N 5/772* (2013.01); *H04N 5/907* (2013.01)

(58) Field of Classification Search
CPC ........... H04N 5/23203; H04N 5/23216; H04N 5/772; H04N 5/907
See application file for complete search history.

(56) References Cited

U.S. PATENT DOCUMENTS

| | | | | |
|---|---|---|---|---|
| 5,289,000 | A | * 2/1994 | Toyofuku | H04N 1/0473 250/234 |
| 6,034,794 | A | * 3/2000 | Suganuma | H04N 1/401 358/518 |
| 2001/0042118 | A1 | * 11/2001 | Miyake | H04L 41/12 709/223 |
| 2002/0159108 | A1 | * 10/2002 | Baba | G03H 1/268 359/9 |
| 2016/0134838 | A1 | * 5/2016 | Tangeland | H04N 5/23219 348/14.09 |

FOREIGN PATENT DOCUMENTS

JP    2006-217211    8/2006

* cited by examiner

*Primary Examiner* — Nhan T Tran (74) *Attorney, Agent, or Firm* — John C. Pokotylo; Pokotylo Patent Services (57) ABSTRACT

An imaging apparatus comprises an image sensor that acquires image data of a physical object, an imaging position change controller that changes imaging position of the image sensor, a memory that stores position of the image sensor that has been changed by the imaging position change controller and control data for controlling imaging conditions at the time of imaging by the image sensor, and a communication circuit that carries out communication with an external terminal, wherein the communication circuit performs communication to carry out positional and imaging control in accordance with position of the image sensor and the imaging conditions that have been stored in the memory, and communicates information that has been acquired as a result of imaging by the image sensor.

11 Claims, 4 Drawing Sheets

IMAGING APPARATUS AND CONTROL METHOD FOR IMAGING APPARATUS

Benefit is claimed, under 35 U.S.C. § 119, to the filing date of prior Japanese Patent Application No. 2016-003491 filed on Jan. 12, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and a control method for an imaging apparatus, and in particular that perform positional control of an imaging apparatus that is capable of changing position, and image transfer, by communication.

2. Description of the Related Art

A wireless direction adjustment device that moves an imaging apparatus such as a camera in horizontal and vertical directions, and carries out shooting instruction, has been proposed (refer to Japanese patent laid-open No. 2006-217211 (hereafter referred to as patent publication 1)). This wireless direction adjustment device comprises a mechanism side wireless unit attached at a video imaging apparatus side, and a controller that is held by the photographer and controls the mechanism side wireless unit.

The wireless direction adjustment device carries out control of the mechanism side wireless device wirelessly, and the control and structure are complicated.

SUMMARY OF THE INVENTION

An object of the present invention is to provide an imaging apparatus and a control method for an imaging apparatus that can perform positional control and image reception etc. for an imaging apparatus with a simple structure.

An imaging apparatus of a first aspect of the present invention comprises an image sensor that acquires image data of a physical object, an imaging position change controller that changes imaging position of the image sensor, a memory that stores position of the image sensor that has been changed by the imaging position change controller and control data for controlling imaging conditions at the time of imaging by the image sensor, and a communication circuit that carries out communication with an external terminal, wherein the communication circuit performs communication to carry out positional and imaging control in accordance with position of the image sensor and the imaging conditions that have been stored in the memory, and communicates information that has been acquired as a result of imaging by the image sensor.

A control method for an imaging apparatus of a second aspect of the present invention comprises reading out position of an image sensor and control data for controlling imaging conditions at the time of imaging using the image sensor, acquiring image data of a physical object using the image sensor, changing imaging position of the image sensor on the basis of the control data, and performing communication to carry out positional and imaging control in accordance with position of the image sensor and the imaging conditions, and communicating information that has been acquired as a result of imaging by the image sensor to an external terminal.

DETAILED DESCRIPTION OF THE PREFERRED EMBODIMENTS

Figure 1:
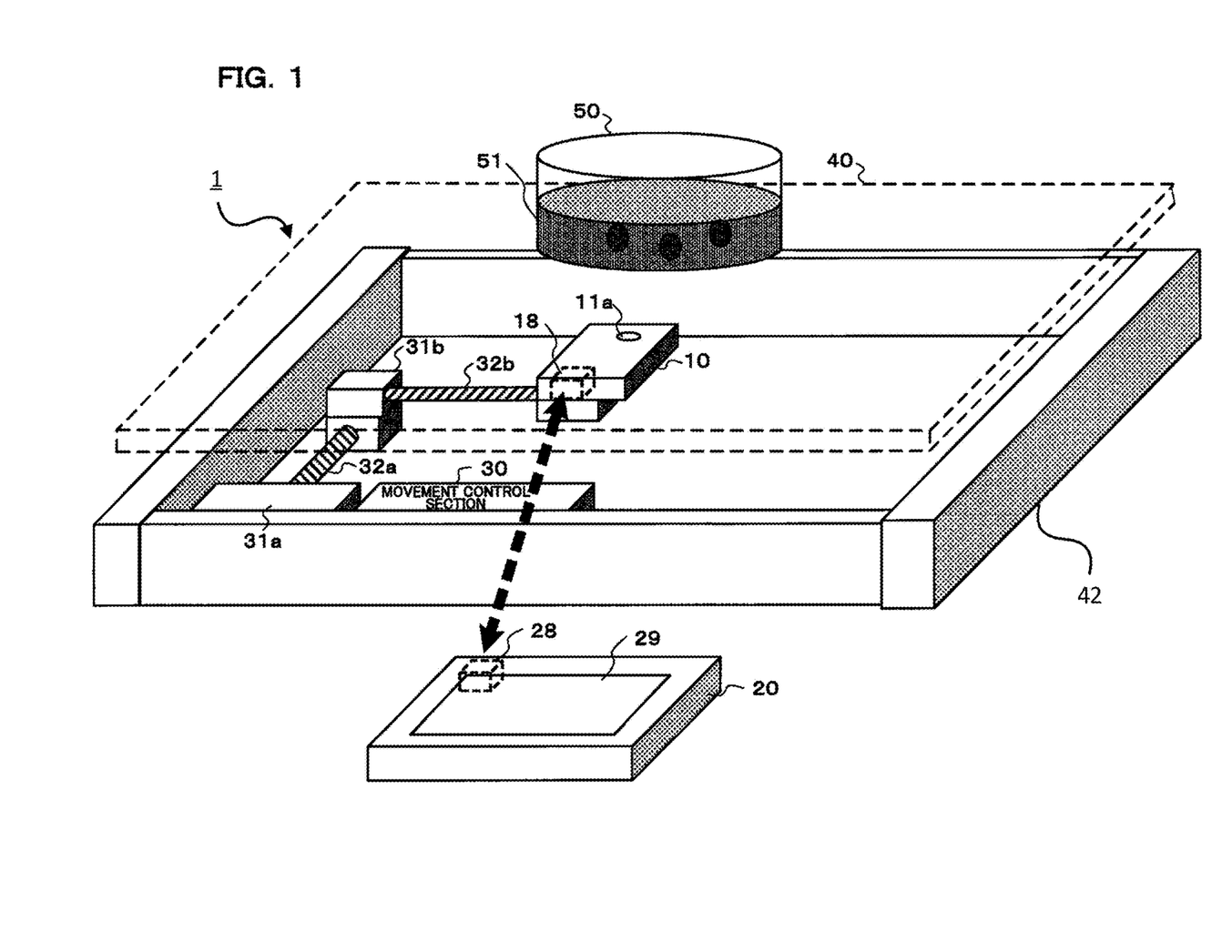
FIG. 1 is a perspective drawing showing usage states of an imaging system of one embodiment of the present invention.

An example applied to an imaging system will be described as one embodiment of the present invention. FIG. 1 is a perspective drawing showing the overall structure of the imaging system. This imaging system has an imaging unit 1 and an operation section 20, with the imaging unit 1 being arranged within a high temperature tank or incubator (not shown) or the like that keeps the environment constant, and the operation section 20 being arranged outside the high temperature tank, incubator, etc. The imaging unit 1 forms an image of a specimen 51 cultivated in a container 50, and can count specimens 51 from the formed image. As a result, measurement and observation are carried out within the incubator and it is possible to preserve the environment, which means that reliability is increased. Also, since observation within the incubator is carried out remotely, energy saving and highly reliable design is carried out.

The imaging unit 1 has a camera section 10, Y actuator 31a, X actuator 31b, Y feed screw 32a, X feed screw 32b, movement control section 30, transparent plate 40, and housing 42. The camera section 10 has a lens 11a, with an image that has been formed by the lens 11a being subjected to photoelectric conversion by an imaging section 11 (refer to FIG. 2) to acquire image data. A communication section 18 is also arranged inside the camera section 10, and wireless communication is possible with a communication section 28 within and operation section 20 that is arranged externally to the imaging unit 1. The detailed structure of the camera section 10 will be described later using FIG. 2.

The camera section 10 is held on the X feed screw 32b and can be moved in the X axis direction by rotation of the X feed screw 32b. The X feed screw 32b is driven to rotate by the X actuator 31b. The X actuator 31b is held on the Y feed screw 32a, and can be moved in the Y axis direction by rotation of the Y feed screw 32a. The Y feed screw 32a is driven to rotate by the Y actuator 31a.

The movement control section 30 includes a movement driving circuit, and carries out drive control for the Y actuator 31a and the X actuator 31b, and performs drive control of the camera section 10 in the X axis and Y axis directions in accordance with a procedure that has been preprogrammed. Also, in a case where the user has moved the camera section 10 to a particular position, since a manual operation is instructed by the operation section 20, the movement control section 30 moves the camera section 10 in accordance with the user's instruction.

It should be noted that although not shown in FIG. 1, a built in power supply battery is provided inside the imaging unit 1, and supplies power to the movement control section 30, Y actuator 31a, X actuator 31b, and camera section 10, and a communication line is also provided for bidirectional communication of control signals between each of the sections. With this embodiment it is assumed that a power supply battery is used as the power supply but this is not limiting, and supply of power may also be implemented using an AC power supply. It is also assumed that control signals between each of the sections are interchanged by means of wired communication, but it is also possible to use wireless communication.

The above described camera section 10, Y actuator 31a, X actuator 31b, Y feed screw 32a, X feed screw 32b, and movement control section 30 are arranged inside the transparent plate 40 and outer housing 42. The transparent plate 40 and outer housing 42 constitute an encapsulating structure such that moisture does not infiltrate into the inside from outside. As a result the inside of the transparent plate 40 and the outer housing 42 are not subjected to high humidity, even if the inside of the incubator is high humidity.

It is possible to mount the container 50 on the upper side of the transparent plate 40, and it is possible to fill a culture medium into the inside of the container 50 and cultivate a specimen 51 (cells). The lens 11a of the camera section 10 forms an image of the culture within the container 50, and by analyzing the image it is possible to count the specimen 51. Specifically, it is possible to count the specimen 51 within the container 50 while moving the camera section 10 using the X actuator 31b and the Y actuator 31a.

The operation section 20 has a communication section 28, and can perform wireless communication with the communication section 18 inside the imaging unit 1. This means that it is possible for the operation section 20 to carry out communication with the camera section 10 from a position that is isolated from the imaging unit 1, and it is possible to move the camera section 10 and to receive image data that has been acquired by the camera section 10. It should be noted that the operation section 20 may be a dedicated unit, or an information terminal device such as a smartphone may also double as the operation section.

Figure 4:
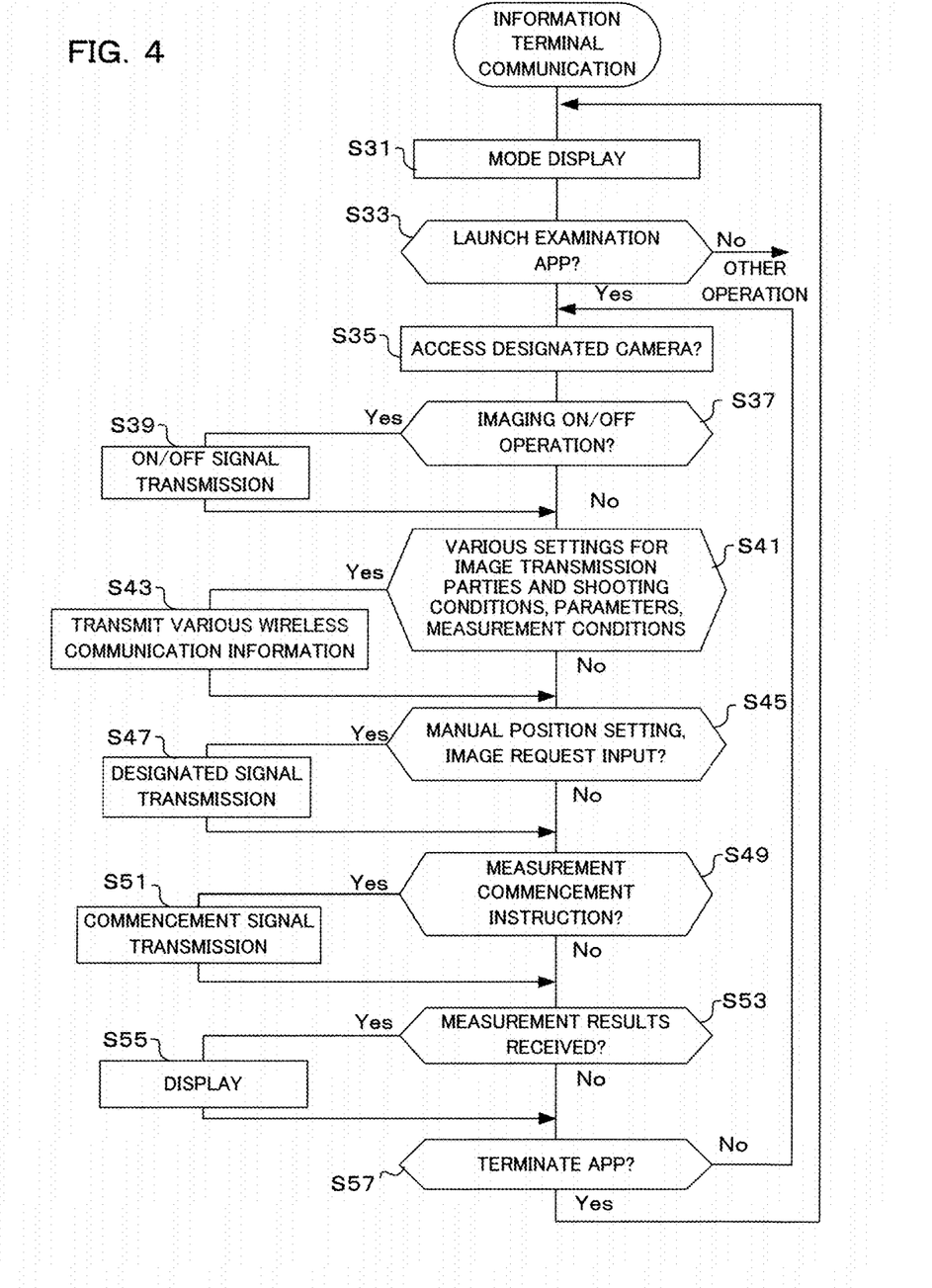
FIG. 4 is a flowchart showing operation of an information terminal of one embodiment of the present invention.

Also, the operation section 20 has a display 29, and the display 29 carries out display of icons used for various modes of the operation section 20 and various settings (refer, for example, to S31 in FIG. 4). If a touch panel is provided on the display 29, it is possible to carry out various inputs using a touch operation. The display 29 also displays images that have been acquired and transmitted by the camera section 10 (refer to S55 in FIG. 4).

Figure 2:
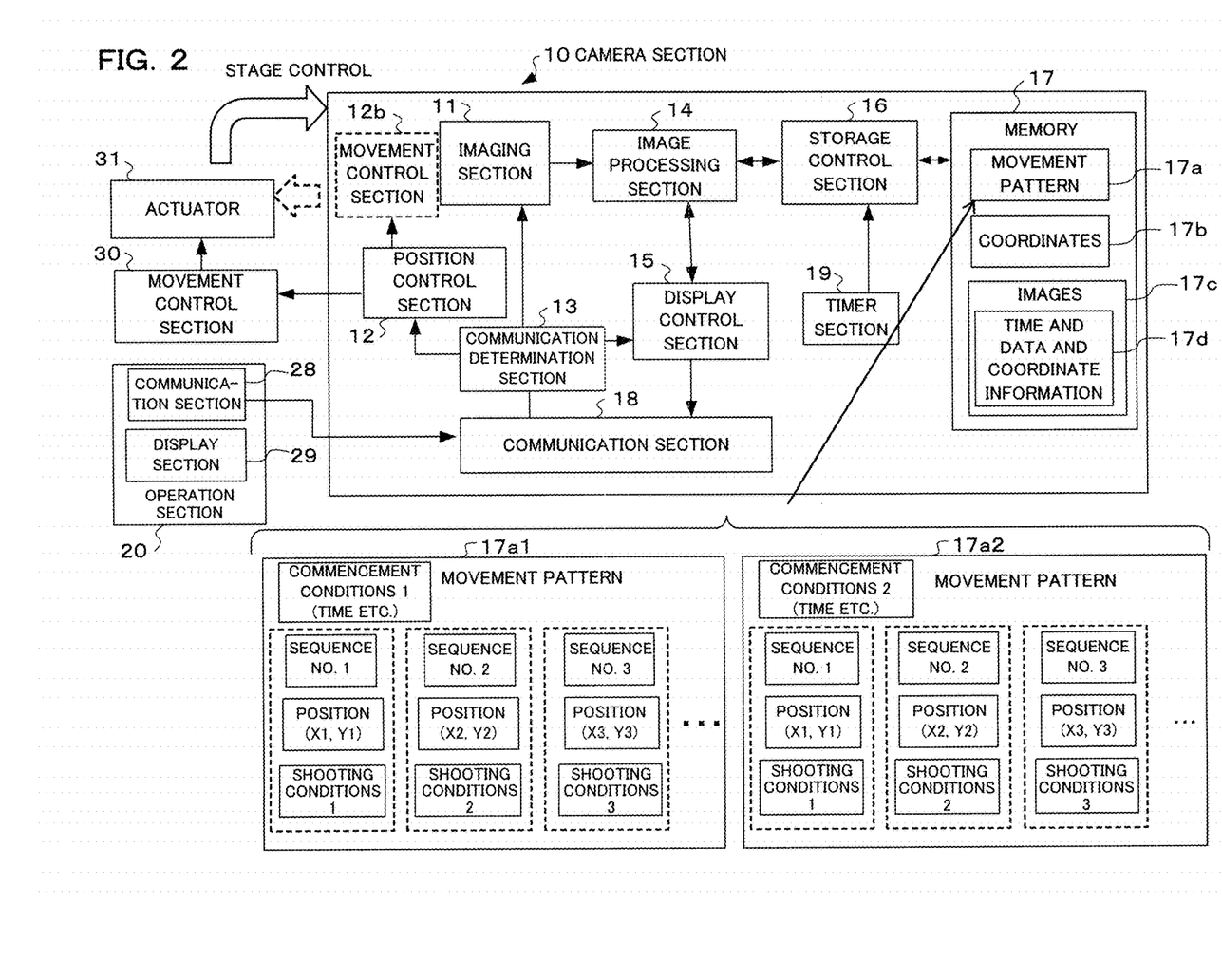
FIG. 2 is a block diagram mainly showing the electrical structure of the imaging system of one embodiment of the present invention.

Next, the electrical structure of the imaging system of this embodiment will mainly be described using FIG. 2. The imaging section 11 has an image sensor and an imaging control circuit etc., with an image that has been formed by the lens 11a being subjected to photoelectric conversion and image data output to the image processing section 14. The imaging section 11 also has an exposure control section such as an aperture, mechanical shutter or electronic shutter, and carries out control in accordance with an exposure control instruction from a communication determination section 13. An image sensor of the imaging section 11 acquires image data of a physical object. As well as imaging, there is also an illumination section (not shown), and shooting, observation and aids to measurement may be carried out by illuminating the physical object.

The image processing section 14 has an image processing circuit, and performs various image processing such as optical black (OB) subtraction processing, white balance (WB) correction, demosaicing processing carried out in the case of Bayer data, color reproduction processing, gamma correction processing, color matrix computation, noise reduction (NR) processing, edge enhancement processing etc. on image data that has been output from the imaging section 11. Image processing that places importance on visibility, and image processing for measurement that is appropriate to image determination of a physical object, are made possible. As required, illumination may also be switched to supplement observation etc.

A storage control section 16 has a storage control circuit, and carries out control in order to store image data that has been subjected to image processing by the image processing section 14 in the memory 17. In storage control of the image data, coordinate information representing position of the camera 10 when shooting was carried out, and time and date information when shooting was carried out, are attached to the image data as tag information. The storage control section 16 also carries out readout control for movement pattern 17a, coordinate information 17b and image data 17c affixed with time and date and coordination information 17d that have been stored in the memory 17. A timer section 19 generates time and date information and outputs this information to the storage control section 16.

The memory 17 is a non-volatile electrically rewritable memory, and stores the previously described movement pattern 17a, coordinate information 17b, time and date and coordinate information 17d and image data 17c. Among these items of information the image data 17c is associated with the time and date and coordinate information 17d, making it possible to know when and where shooting took place. The coordinate information 17b records reference coordinates etc. at the time of movement and is used when storing representative position of a measured physical object, etc.

The movement pattern 17a records movement patterns that store commencement condition 1, sequence number, position, and shooting conditions for commencement of movement of the camera section 10, such as shown by movement pattern 17a1, 17a2, . . . , as shown at the bottom part of FIG. 2. These movement patterns 17a1, 17a2, 17a3, . . . may be changed, in a manner of movement patterns 17a1, 17a21, 17a31, . . . , in accordance with change in conditions at the time of measurement. A plurality of movement patterns are stored in advance and may be automatically switched in accordance with conditions, patterns may be switched upon confirmation of the conditions by the user, or patterns can be altered by means of communication. As constituent elements of a movement pattern, in this embodiment there are time, shooting conditions, and shooting position (coordinates), but as well as these items information on a physical object etc. that is to be measured may also be included. There may be situations where a plurality of users perform observation using the same device, and so it may be possible for a user to store information individually.

The memory 17 stores position of the image sensor that is changed by an imaging position change controller, and control data for controlling imaging conditions when performing imaging using the image sensor. This memory stores position of the imaging section in accordance with time, and a plurality of movement patterns for imaging conditions using the imaging section.

Image data 17c stored in the memory 17 is image data that has been acquired using the imaging section 11. Also, time and date and coordinate information 17d is stored by having tags attached to individual image data 17c. The memory 17 functions as a memory that stores image data that has been imaged by the image sensor. Obviously, it is not always necessary to store imaging results and measurement results in the memory 17, and these items of information may be externally transmitted by means of communication and stored in a memory of an external device.

The communication section 18 has a communication circuit and interface circuit (also collectively referred to as communication circuit), an antenna in the case of wireless communication, or a cable in the case of wired communication, and carries out communication with the communication section 28 within the operation section 20, which is external to the imaging unit 1, as described earlier. The communication circuit of the communication section 18 carries out communication with an external terminal. This communication circuit also performs communication to carry out positioning and imaging control in accordance with position of the image sensor and imaging conditions that have been stored in the memory, and performs communication of information that has been acquired by means of imaging using the image sensor (refer, for example, to S9, S13, S17 and S27 in FIG. 3). Still further this communication circuit carries out communication of signals corresponding to image data (refer, for example, to S17 and S21 in FIG. 3) and signals for changing position of the image sensor using the imaging position change controller (refer, for example, to S9 and S11 in FIG. 3) with the external terminal. In the case of wired communication, supply of power to each of the sections may be carried out using a communication line. Supply of power to each of the sections may also be carried out in combination with a battery.

The communication determination section 13 has a CPU (Central Processing Unit), DSP (Digital Signal Processor) and peripheral circuitry, and carries out control within the camera section 10 in accordance with a program that has been stored in the memory 17. The communication determination section 13 also determines content of communication from the operation section 20 that has been received by the communication section 18, and carries out control for movement of the position of the camera section 10 by the position control section 12, control for acquisition of image data by the imaging section 11, control of reading out of image data that has been stored in the memory 17 by the display control section 15, and transmission to the operation section 20.

Figure 3:
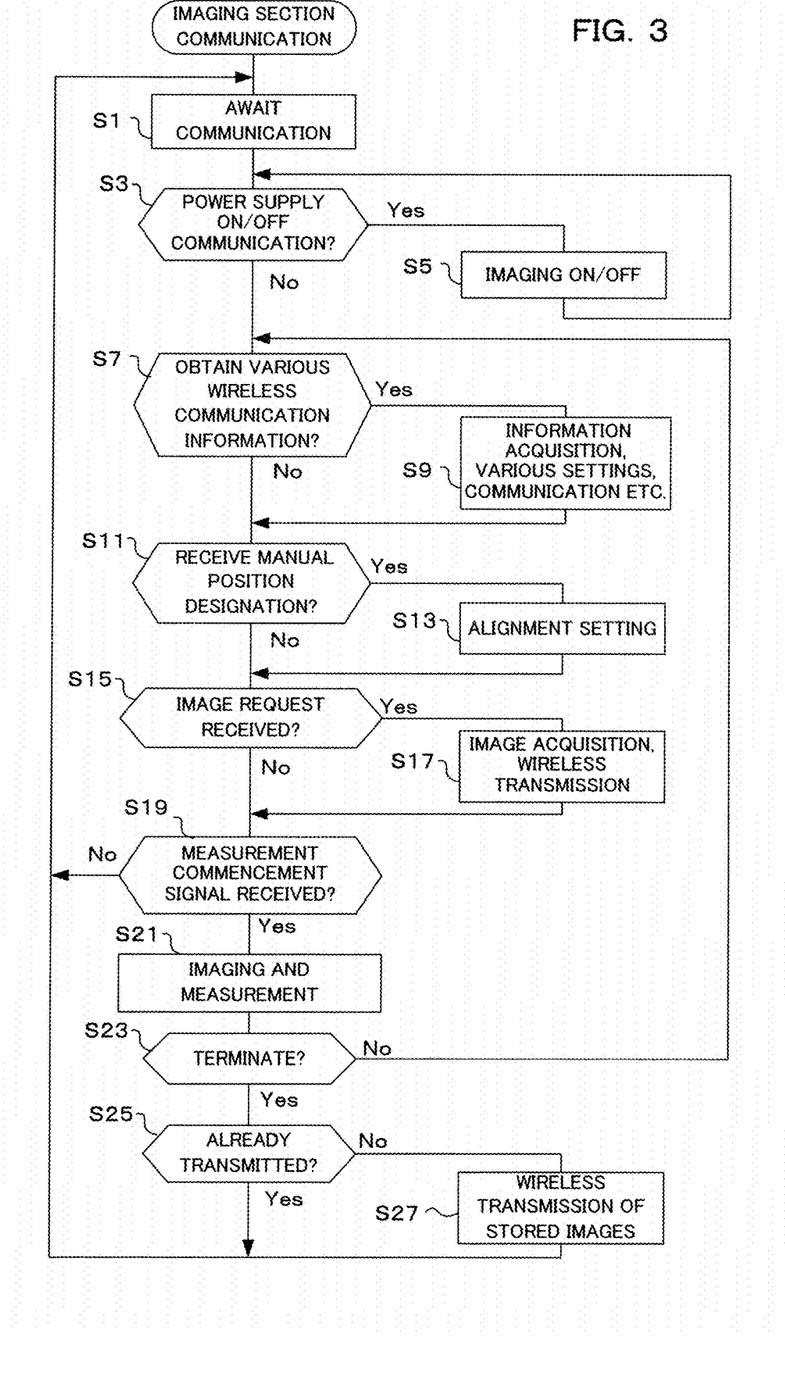
FIG. 3 is a flowchart showing operation of an imaging section of one embodiment of the present invention.

The CPU of the communication determination section 13 functions as a controller for carrying out imaging using the imaging section (refer, for example, to S21 in FIG. 3) in accordance with shooting conditions, while moving position of the imaging section in accordance with a movement pattern (refer, for example, to the movement pattern 17a of the memory 17), if an instruction to commence imaging using the image sensor, that is carried out based on control data, is received by means of the communication circuit (refer, for example, to S19 in FIG. 3).

The CPU of the communication determination section 13 functions as a controller for transmitting image data that has been stored in memory to an external terminal by means of the communication circuit (refer, for example, to S17 and S27 in FIG. 3) if imaging as been carried out by the image sensor (for example, S23 Yes in FIG. 3). The CPU of the communication determination section 13 functions as a controller for transmitting image data to the external terminal (refer, for example, to S17 in FIG. 3) if an image data transmission request is received from the external terminal (refer, for example, to S15 in FIG. 3). The CPU of the communication determination section 13 functions as a controller for transmitting image data to the external terminal by means of the communication circuit (refer, for example, to S27 in FIG. 3) if imaging by the image sensor has been completed for all of a plurality of movement patterns (refer, for example, to S23 Yes in FIG. 3). Here, it is not always necessary to transmit image data, and data such as measurement values and image characteristics that have been acquired from the image data may also be transmitted.

The CPU of the communication determination section 13 functions as a controller for moving the image sensor to a position that has been instructed to the imaging position change controller (refer, for example, to S13 in FIG. 3) if a position has been manually designated from the external terminal by means of the communication circuit (refer, for example, to S11 in FIG. 3 and S47 in FIG. 4). The CPU of the communication determination section 13 functions as a controller for transmitting image data to the external terminal via the communication circuit (refer, for example, to S17 in FIG. 3) if transmission of an image has been requested from the external terminal by means of the communication section (refer, for example, to S15 in FIG. 3 and S47 in FIG. 4). This kind of communication is an important matter at the time of remote operation, and system simplification is required in order to carry out this communication reliably.

A display control section 15 has a display control circuit, and outputs image data, that is appended with time and date and coordinate information, from the memory 17 to the communication section 18 by means of the image processing section 14 and the storage control section 16, when it has been determined by the communication determination section 13 that transmission of image data that has been stored in the memory 17 has been requested. This image data is transmitted from the communication section 18 to the operation section 20.

The position control section 12 has a position control circuit, and controls movement of the camera section 10 by the Y actuator 31a and the X actuator 31b, by means of the movement control section 30, when it has been determined by the communication determination section 13 that movement of the camera section 10 has been requested. The position control section 12 functions as an imaging position change controller for changing imaging position of the imaging section.

The movement control section 30 has a movement control circuit, and carries out control of the Y actuator 31a and the X actuator 31b in accordance with instruction from the position control section 12, to move the camera section 10 in the X direction and the Y direction. The communication determination section 13 and the position control section 12 move the camera section 10 in accordance with a movement pattern that has been stored in the movement pattern 17a of the memory 17, and also carry out imaging using the imaging section 11 and storage of image data.

Specifically, if a commencement condition 1, such as time, is satisfied then the camera 10 commences an operation in order to carry out imaging. First, there is movement to a position (X1, Y1) that has been stored at sequence number 1, and imaging is performed with shooting conditions 1 (aperture, shutter speed, ISO sensitivity etc.). Once imaging has been performed at sequence number 1, imaging is sequentially carried out at sequence number 2, sequence number 3, . . . , and image data at this time is sequentially stored in the memory 17 as image 17c and time and date and coordinate information 17d. Once imaging has been carried out in accordance with movement pattern 17a1, imaging is next carried out (assuming that commencement condition 2 is satisfied) in accordance with movement pattern 17a2, . . . .

It should be noted that with this embodiment the movement control section 30 is provided externally to the camera section 10, but this is not limiting, and a movement control section 12b may also be provided within the camera section 10. In this case, the movement control section 12b carries out drive control for the Y actuator 31a and the X actuator 31b. Also, while, with this embodiment, drive control is carried out on two axes, namely the X axis and the Y axis that is orthogonal to the x-axis, this is not limiting, and drive control may be carried out for only one axis, and other drive control may also be carried out, such as control on r and θ axes, namely control in two directions of a radial direction and a circumferential direction.

Next, operation of the imaging unit 1 will be described using the flowchart shown in FIG. 3. This flowchart is executed by the CPU within the communication determination section 13 controlling each of the sections within the imaging unit 1 in accordance with program code that is stored within the memory 17. It should be noted that with this embodiment the program code is executed by the CPU within the communication determination section 13, but this is not limiting, and the code may also be executed by a CPU provided in another section, and further is not limited to a CPU being provided in a single section and CPUs may be provided in a plurality of sections and the code executed by the CPUs working in collaboration.

If the flowchart for imaging section communication shown in FIG. 3 is commenced by a power supply being switched on or the like, first a communications standby state is entered (S1). Here, commencement of communication from the operation section 20 is awaited. Specifically, in the event that the user provides instruction to the imaging unit 1 that has been arranged inside a chamber that is isolated from the operation section 20, such as an incubator, the operation section 20 is operated. This step is a state of awaiting receipt of a control signal based on this operation, using wireless communication.

Next, it is determined whether or not power supply on/off communication has been performed (S3). As was described previously, with this embodiment power supply for the imaging unit 1 is supplied using a battery, and so in order to prevent consumption of the power supply batteries it is possible for the user to carry out a power supply on or power supply off instruction from the operation section 20.

If the result of determination in step S3 is that there has been power supply on/off communication, imaging on/off processing is carried out (S5). Here, in the case of power supply on, the communication determination section 13 turns the power supply of the imaging section 11 off, while in the case of power supply off the power supply of the imaging section 11 is turned on. Power supply on/off for each of the other sections may also be carried out in tandem with power supply on/off of the imaging section 11. However, the minimum power supply needed to execute functions for determining instructions from the operation section 20 is supplied. It is possible to reduce wasteful energy consumption as a result of this power supply control.

If the result of determination in step S3 is not power supply on/off communication, it is determined whether or not various wireless communication information has been acquired (S7). If the user carries out various settings by operating the operation section 20, this setting information is transmitted by wireless communication from the communication section 28 of the operation section 20. Information that is necessary to imaging is also transmitted by wireless communication from the communication section 28. For example, as information that is transmitted here there is information relating to transmission destination of the image data, conditions for at the time of imaging, various parameters, and measurement conditions for when measuring the specimen 51 etc. In this step it is determined whether or not these settings and information have been received from the communication section 18 within the camera section 10.

If the result of determination in step S7 is that various wireless communication information has been acquired, information acquisition, various setting and communication etc. are carried out (S9). In this step various settings within the camera section 10 are carried out based on various information and settings that have been acquired by the communication section 18.

Once the information acquisition, various settings and communication etc. have been carried out in step S9, or if the result of determination in step S7 was that various information has not been acquired, it is next determined whether or not a manual position designation has been received S11). There may be cases where the user designates a position during preparations for measurement of the specimen 51 within the container 50, or during measurement itself, and wishes to observe images at that position. In such a case the user can designate imaging position by operating the operation section 20. In this step, it is determined whether or not wireless communication for carrying out this manual position designation has been received.

If the result of determination in step S11 is that manual position designation has been received, alignment is carried out (S13). Here, the position control section 12 outputs control signals to the movement control section 30 so as to cause movement of the camera section 10 to the manual position that was received by wireless communication. The movement control section 30 carries out drive control of the Y actuator 31a and the X actuator 31b to move the camera section 10 to the manual position that has been designated.

If alignment setting has been carried out in step S13, or if it has been determined that manual position designation has not been received, it is next determined whether or not an image request has been received (S15). There may be cases where the user, while preparing for measurement or during measurement, wishes to observe images at the manual position that has been designated. In such situations the operation section 20 is operated to transmit an image request. There may also be cases where during measurement the user wishes to confirm images that have been captured so far, and in this type of situation also an image request is transmitted by operating the operation section 20. In this step, therefore, it is determined whether or not an image request signal has been received from the operation section 20.

If the result of determination in step S15 is that there is an image request signal, an image is acquired and wireless communication is carried out (S17). In this case, imaging is performed at the point where alignment was carried out in step S13, and that image is transmitted to the operation section 20. Also, in a case where, during measurement, there has been a transmission request for images that have been taken so far, images 17c of the memory 17 are read out and transmitted to the operation section 20. It should be noted that in step S9, in the event that a section other than the operation section 20 is designated as the transmission destination for the image data, the image data is transmitted to the designated transmission destination. Also, in a case where images have been transmitted, a transmitted flag is set for the transmitted image data.

If images have been acquired and wireless communication carried out in step S17, or if the result of determination in step S15 is that an image request has not been received, it is next determined whether or not a measurement commencement signal has been received (S19). In the event that the user commences measurement, such as counting the number of specimens 51 within the container 50, the fact that measurement is to be commenced is instructed to the imaging unit 1 by operation of the operation section 20. Here it is determined whether or not a measurement commencement signal to instruct commencement of this measurement has been received. If the result of this determination is that a measurement commencement signal has not been received, processing returns to step S1 and the previous operations are executed.

On the other hand, if the result of determination in step S19 is that a measurement commencement signal has been received, imaging and measurement are commenced (S21). Here, in accordance with an alignment program that has been set and stored, measurement is performed using shooting conditions that have been set, images are stored, and if measurement is interrupted and restarted, the measurement is restarted from the interrupted position.

Specifically, the camera section 10 sequentially carries out imaging in accordance with positions and shooting conditions that have been designated by the movement patterns 17a1, 17a2, . . . that have been stored in the memory 17, and the image data that has been acquired is stored in the memory 17. At the time of storage, various data such as position of the camera section 10, time, shooting conditions etc. is appended as tags. This imaging involves a read out step of reading out position of the camera section 10 and control data (for example, movement pattern 17a) for controlling imaging conditions at the time of imaging using the camera section 10, an imaging step of acquiring image data of a physical object including the specimen 51 using the camera section 10, and a position changing step of changing imaging position of the camera section 10 based on control data. In this way, since position and shooting conditions are set in accordance with various control data that has been stored in memory, at that time it is not necessary for the operation section 20 to carry out frequent communication with the camera section 10, and wasteful energy consumption for communication is suppressed. Description has been given here regarding shooting conditions, but is also possible to set lighting conditions etc.

Also, the number of specimens 51 is counted and stored by analyzing image data. Counting of the specimens 51 is carried out by detecting edges and contours within the image data, and using various known procedures such as extracting individual specimens 51. The number of the specimens 51 is appended as a tag to the image data and stored in the memory 17.

There may also be cases where measurement is interrupted, such as when a manual position designation is received or an image request signal is received during measurement. In this type of situation, processing that has been requested is executed, and when restarting the measurement, measurement commences from the interrupted position. Therefore, position when the interrupt occurred, and sequence number for the movement pattern 17a etc., are stored in the memory 17.

If imaging and measurement have been carried out, it is next determined whether or not the imaging and measurement have been completed (S23). Here, it is determined whether or not imaging and measurement have been completed in accordance with all movement patterns 17a that are stored in the memory 17. If the result of this determination is that imaging and measurement have been completed, processing returns to step S7 and the previous operations are executed. In the event that the user operates the operation section 20 during measurement and various settings, designation of manual position or an image request are carried out, processing is executed in accordance with these instructions.

If the result of determination in step S23 is that imaging and measurement are complete, it is determined whether or not there has been transmission (S25). Here it is determined whether or not an image 17c appended with time and date and coordinates 17d that have been stored in the memory 17 has been transmitted to the operation section 20. Since images that were already transmitted in step S17 would become duplicates, it is determined whether or not there has been transmission for each image, in order to transmit unsent image data. Accordingly, with this embodiment, depending on imaging position and imaging conditions that have been stored in the memory 17, the communication section 18 will have a time for carrying out communication for positioning and shooting control of the imaging section 11 (may also be for the camera section 10) and a time for communication of information that has been acquired by imaging.

If the result of determination in step S25 is that there are images that have not already been transmitted, stored images are subjected to wireless transmission (S27). Here, among the images that were captured in step S21, images that were not transmitted in step S17 are subjected to wireless transmission.

If stored images have been transmitted in step S27, or if the result of determination in step S25 was that there were already transmitted images, processing returns to step S1 and the previously described operations are executed.

In this way, signals corresponding to image data (refer, for example, to S17 and S27), and signals for changing position of the camera section 10 (refer, for example, to S13, S15, S19 and S21) are interchanged between the communication section 18 within the imaging unit 1 and the communication section 28 within the operation section 20 using imaging section communication. In this way, together with exchange of image data, movement control of the camera section 10 is carried out using a single communication circuit, and as a result it is possible to simply carry out imaging and measurement of a physical object to be measured, even if the imaging unit 1 is isolated inside a closed chamber, such as an incubator.

Also, if a measurement commencement signal is received (refer to S19), imaging is carried out at sequential measurement positions in accordance with given sequence numbers, in accordance with a movement pattern 17a that has been stored in the memory 17. As a result, if a movement pattern is decided upon in advance, it is possible to carry out imaging and measurement automatically. It is also possible to observe a specimen even if imaging is interrupted during measurement (refer, for example, to S11-S15). Also, in the case of an interrupt during measurement, measurement is restarted from the interrupted position (refer, for example, to S21).

It should be noted that shooting conditions that are appropriate when the user is visually observing the specimen 51 within the container 50 (such as aperture, shutter speed, ISO sensitivity) are not necessarily the same as the shooting conditions that are appropriate to measuring (counting) the specimen 51. It is also possible that there may be cases where live view type shooting conditions for visual observation and shooting conditions for storage are different. Shooting may therefore be respectively carried out with a plurality of shooting conditions, to acquire image data. Also, only in a situation where the user has requested images for observation (refer, for example, to S15), shooting may be carried out using shooting conditions that are appropriate to visual observation, and when carrying out shooting for measurement in accordance with the movement pattern 17a shooting may be carried out using shooting condition that are appropriate to measurement. Also, as shooting conditions, there are shooting conditions corresponding to changes in degree of lighting, shooting conditions corresponding to collection conditions and growth conditions of cells, focus conditions that are appropriate for positions of cells etc., and shooting may be carried out under numerous conditions.

Next, operation of the operation section 20 will be described using the information terminal communication flowchart shown in FIG. 4. This flowchart is executed by the control section (CPU) within the operation section 20 controlling each of the sections within the operation section 20 in accordance with program code that is stored within memory.

If the flow for information terminal communication is entered, first mode display is carried out (S31). Here the mode of the operation section 20 is displayed on the display 29. For example, if the operation section 20 doubles as a smart phone, there are mobile phone mode, mail mode etc.

Once mode display has been carried out, it is next determined whether or not to launch an examination application (S33). Here it is determined whether or not an application for examining (measuring) to count a number of specimens 51 (hereafter referred to as "examination application") will be launched. For example, an examination application icon is displayed, and if a touch operation is performed on this icon it is determined that the examination application will be launched. Besides this approach, it may be determined to launch the application if a cursor is moved to select the icon, and it may be determined to launch the application if a dedicated button is operated. If the result of this determination is not to launch the examination application, then other operations are carried out. For example, in the case of a smart phone, mobile phone operations and mail operations are carried out.

If the result of determination in step S33 is to launch the examination application, then a designated camera is accessed (S35). Here access is made to a camera that has been designated using the operation section 20 (the imaging unit 1 with the example in FIG. 1). Specifically, communication is carried out from the communication section 28 of the operation section 20 to the communication section 18 of the imaging unit 1.

Next it is determined whether or not an imaging on/off operation has been carried out (S37). Since the imaging unit 1 is mounted in a sealed chamber such as an incubator to examine the specimen 51 within the container 50, and is supplied with power by power supply batteries, it is possible to instruct power supply on/off for the imaging apparatus from the operation section 20 in order to prevent power supply wastage. Here it is determined whether or not on/off operations for the power supply have been carried out with the operation section 20.

If the result of determination in step S37 is that an imaging on/off operation has been carried out, an on/off signal is transmitted (S39). Here, an imaging on/off signal is transmitted from the communication section 28 of the operation section 20 to the communication section 18 of the camera section 10. The camera section 10 executes an imaging on/off operation (refer to S5 in FIG. 3) if this signal is received (refer to S3 in FIG. 3).

If the on-off signal has been transmitted in step S39, or if the result of determination in step S37 is that an imaging on/off operation is not carried out, it is next determined whether or not to carry out various settings, such as for image transmission parties, shooting conditions, parameters and measurement conditions etc. (S41). It is possible to designate destinations for transmission of image data that has been captured by the imaging unit 1, and various information that is attached to the image data as tags (time and date information, position information, measurement (examination) result information). Transmission destination is not limited to the operation section 20, and another information terminal or the like may be designated.

Also, parameters and measurement conditions may also be set in addition to shooting conditions (focus position, aperture value, shutter speed value, ISO sensitivity value, switching of image processing including enhancement of edges, contrast and color etc., and brightness pattern and wavelength of illumination) for when the imaging unit 1 is imaging. The movement pattern 17a may also be set to other than a pattern that is stored in the memory 17 as default. In this step S41, it is determined whether or not an operation has been carried out in order to carry out these various settings.

If the result of determination in step S41 is that operations for various settings have been carried out, various wireless communication information is transmitted (S43). Here, operated information is transmitted from the communication section 28 to the communication section 18 of the camera section 10 based on the determination in step S41 (refer to S7 and S9 in FIG. 3).

If various wireless communication information has been transmitted in step S43, or if the result of determination in step S41 was that an operation for various settings was not performed, it is next determined whether or not manual position setting or an image request have been input (S45). As was described previously, if the user designates position of the camera section 10 when preparing for measurement or during measurement, and they wish to observe images that have been acquired with the camera section 10, it is possible to carry out designation from the operation section 20. In this step, it is determined whether or not these operations have been performed.

It should be noted, regarding position designation of the camera section 10, that designation may be by absolute position, such as (x, y) coordinates, and may be designation of movement by relative positional designation in a horizontal direction and vertical direction, while observing an image. Besides this it is also possible to have movement control in accordance with operation amount of a touch panel, switch or dial of the operation section, or movement may be controlled in a manner such that a typical observation point is determined and that location is moved to.

If the result of determination in step S45 is that manual position setting or an image request have been input, designation signals are transmitted (S47). Here signals corresponding to operations in step S45 are transmitted from the communication section 28 to the communication section 18 of the camera section 10 (refer to S11-S17 in FIG. 3).

If designation signals have been transmitted in step S43, or if the result of determination in step S45 was that manual position setting or an image request were not input, it is next determined whether or not to carry out a measurement commencement instruction (S49). It is determined whether or not an instruction has been carried out to perform shooting while sequentially moving the camera section 10 in accordance with a measurement start instruction, specifically, a movement pattern 17a, and commence measurement, such as counting of the specimens 51, based on image data that has been imaged. An instruction to commence measurement may be carried out by a touch operation or the like on a measurement commencement icon that has been displayed on the display 29 of the operation section 20. Besides this, or in combination with the touch operation etc., processing may be carried out at specified time intervals, and processing may be carried out under conditions defined by a specified program.

If the result of determination in step S49 is that there has been a measurement commencement instruction, a commencement signal is transmitted (S51). Here, a measurement commencement signal is transmitted from the communication section 28 to the communication section 18 of the camera section 10 (refer to S19 and S21 in FIG. 3).

If a commencement signal has been transmitted in step S51, or if the result of determination in step S49 is that there was not a measurement commencement instruction, it is next determined whether or not measurement results have been received (S53). Here, images acquired using the camera section 10 that have been transmitted are displayed on the display 29. Measurement results of the specimen 51 etc. also displayed.

If display has been carried out in step S55, or if the result of determination in step S53 was that measurement results were not received, it is determined whether or not to terminate the application (S57). Here it is determined whether or not an instruction to terminate operation of the scanning application, that was launched in step S33, has been issued. If the result of this determination is that the scanning operation is not to be terminated processing returns to step S35, while if the scanning application is to be terminated processing returns to step S31.

In this way, in the information terminal communication flow, if various setting operations to operate the camera section 10 are carried out in the operation section 20, signals based on the settings are transmitted to the communication section 18 of the camera section 10 via the communication section 28 (for example, S39, S43, S47 and S51). Also, images that have been acquired by the camera section 10 are transmitted from the communication section 18 of the camera section 10 to the communication section 28 (S55). In this way, even if the imaging unit 1 is isolated inside a sealed chamber such as an incubator, it is possible to transmit instructions from the operation section 20, and it is possible to receive image data from the imaging unit 1. This means that it is possible to carry out imaging and measurement of a physical object to be measured simply.

As has been described above, the one embodiment of the present invention has an imaging section (for example the imaging section 11) for acquiring image data of a physical object, an imaging position change section (for example the position control section 12) that changes imaging position of the imaging section, a memory section (for example, the memory 17) for storing position of the imaging section data has been changed by the imaging position change section and control data (for example, the movement pattern 17a) for controlling imaging conditions at the time of imaging using the imaging section, and a communication section (for example the communication section 18) that carries out communication with an external terminal (for example, the operation section 20), wherein the communication section carries out communication of signals corresponding to the image data, and signals for changing position of the imaging section using the imaging position change section, to an external terminal (refer, for example, to S7, S11, S15 and S19 in FIG. 3, and S43, S47 and S51 in FIG. 4). This means that even in a state where the imaging apparatus has been isolated, it is possible to move the imaging apparatus in the horizontal and vertical directions, to carry out shooting instructions, and to receive images etc.

It should be noted that in the one embodiment of the present invention, description has been given using an example where a specimen 51 that is cultivated in culture medium within a container 50 is assumed as a measurement object, but this is not limiting, and imaging may be performed while moving the imaging section within a given range, and as long as there is a target portion when performing measurement this is not limiting. The communication method also does not need to be limited to wireless communication, and wired communication may also be used. Besides this, this embodiment can be utilized in any remote shooting examination system, device or method that carries out a combination of performance examination of products, performance examination of parts and packages, movement control and shooting control.

Also, with each of the embodiments of the present invention the position control section 12, communication determination section 13 and display control section 15 are constructed separately, but some or all of these sections may be configured as software, and may be executed using one or a plurality of CPUs and their peripheral circuitry. Also, each of the sections within the imaging unit 1 and operation section 20 may be constituted by hardware circuits and simple devices, or may be constituted by software using the CPU and the program, and may also be constituted using a DSP (Digital Signal Processor). Suitable combinations of these approaches may also be used.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus, arranged inside a transparent plate and an outer casing that constitute an encapsulating structure, comprising:
   an image sensor that acquires image data of a physical object that has been placed on the transparent plate;

an imaging position change controller that changes imaging position of the image sensor by translation on a two-dimensional plane;

a memory that stores control data for position of the image sensor on a two-dimensional plane that has been changed by the imaging position change controller and for controlling imaging conditions at the time of imaging by the image sensor; and a communication circuit that carries out communication with an external terminal, wherein the communication circuit performs communication to carry out positional and imaging control on the two dimensional plane in accordance with position of the image sensor or the two dimensional plane and the imaging conditions that have been stored in the memory, and communicates information that has been acquired as a result of imaging by the image sensor.

2. The imaging apparatus of claim 1, wherein:
the memory stores a plurality of movement patterns for positions of the image sensor on the two dimensional plane in accordance with time and imaging conditions using the image sensor.

3. The imaging apparatus of claim 2, further comprising:
a controller that, if an instruction to commence imaging using the image sensor, carried out based on the control data, is received by means of the communication circuit, carries out imaging using the image sensor in accordance with the imaging conditions, while moving position of the image sensor on the two dimensional plane in accordance with the movement pattern.

4. The imaging apparatus of claim 3, wherein:
the memory further stores image data that has been captured by the image sensor, and the controller, if imaging is carried out using the image sensor, transmits the image data that has been stored in the memory to the external terminal by means of the communication section.

5. The imaging apparatus of claim 4, wherein:
the controller, if a transmission request for the image data is received from the external terminal, transmits the image data to the external terminal.

6. The imaging apparatus of claim 4, wherein:
the controller, if imaging using the image sensor has been completed for all of the plurality of movement patterns, transmits the image data to the external terminal by means of the communication circuit.

7. The imaging apparatus of claim 3, wherein:
the controller, if position on the two dimensional plane has been instructed manually from the external terminal by means of the communication circuit, moves the image sensor to the position on the two dimensional plane that has been instructed using the imaging position change controller.

8. The imaging apparatus of claim 3, wherein:
the memory further stores image data that has been captured by the image sensor, and
the controller, if transmission of images by means of the communication circuit has been requested from the external terminal, transmits the image data to the external terminal by means of the communication circuit.

9. A control method for an imaging apparatus, arranged inside a transparent plate and an outer casing that constitute an encapsulating structure, comprising the step of:
reading out position of an image sensor on the two dimensional plane and control data for controlling imaging conditions at the time of imaging using the image sensor;
acquiring image data of a physical object that has been placed on the transparent plate, using the image sensor;
changing imaging position of the image sensor by translation on a two-dimensional plane on the basis of the control data; and
performing communication to carry out positional and imaging control on the two dimensional plane in accordance with position of the image sensor on the two dimensional plane and the imaging conditions, and communicating information that has been acquired as a result of imaging by the image sensor to an external terminal.

10. The control method of claim 9, further comprising:
storing a plurality of positions of the image sensor on the two dimensional plane in accordance with time, and movement patterns for imaging conditions using the image sensor.

11. A non-transitory computer-readable medium storing a processor executable code, which when executed by at least one processor, performs an imaging method for an imaging apparatus arranged inside a transparent plate and an outer casing that constitute an encapsulation structure, the imaging method comprising:
reading out position of an image sensor on the two dimensional plane and control data for controlling imaging conditions at the time of imaging using the image sensor;
acquiring image data of a physical object that has been placed on the transparent plate using the image sensor,
changing imaging position of the image sensor by translation on a two-dimensional plane on the basis of the control data; and
performing communication to carry out positional and imaging control on the two dimensional plane in accordance with position of the image sensor on the two dimensional plane and the imaging conditions, and communicating information that has been acquired as a result of imaging by the image sensor to an external terminal.

* * * * *